United States Patent
Kim et al.

(10) Patent No.: US 9,720,279 B2
(45) Date of Patent: Aug. 1, 2017

(54) BACKLIGHT UNIT AND RELATED DISPLAY DEVICE

(71) Applicant: Samsung Display Co., Ltd., Yongin, Gyeonggi-Do (KR)

(72) Inventors: Seung Wan Kim, Asan-si (KR); Young Sup Kwon, Gwangmyeong-si (KR); Jae Kyu Park, Cheonan-si (KR); Eun Chul Shin, Cheonan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 16 days.

(21) Appl. No.: 14/698,686

(22) Filed: Apr. 28, 2015

(65) Prior Publication Data
US 2016/0195769 A1    Jul. 7, 2016

(30) Foreign Application Priority Data
Jan. 5, 2015   (KR) .................. 10-2015-0000723

(51) Int. Cl.
G02F 1/1333   (2006.01)
G02F 1/1335   (2006.01)

(52) U.S. Cl.
CPC .. *G02F 1/133608* (2013.01); *G02F 1/133603* (2013.01)

(58) Field of Classification Search
CPC .............. G02B 6/0045; G02B 6/0068; G02F 1/133603; G02F 1/133605
See application file for complete search history.

(56) References Cited

U.S. PATENT DOCUMENTS

2013/0321740 A1*  12/2013  An ................. H05K 5/0217
                                                                  349/58

FOREIGN PATENT DOCUMENTS

| KR | 10-2005-0085066 | 8/2005 |
| KR | 10-2014-0043968 | 4/2014 |
| KR | 10-2014-0059930 | 5/2014 |

* cited by examiner

*Primary Examiner* — Nathanael R Briggs
(74) *Attorney, Agent, or Firm* — Innovation Counsel LLP

(57) ABSTRACT

A backlight unit may include a wall and a plurality of light sources. The wall may have a side in a cross-sectional view of the backlight unit. The side may have a curved shape in the cross-sectional view of the backlight unit. The plurality light sources may include a first light source and a second light source. The second light source may be positioned farther away from a center portion of the wall than the first light source in the cross-sectional view of the backlight unit. A minimum distance between the second light source and the side may be greater than a minimum distance between the first light source and the side in the cross-sectional view of the backlight unit.

14 Claims, 8 Drawing Sheets

BACKLIGHT UNIT AND RELATED DISPLAY DEVICE

CROSS-REFERENCE TO RELATED APPLICATION

This application claims priority to and the benefit of Korean Patent Application No. 10-2015-0000723 filed in the Korean Intellectual Property Office on Jan. 5, 2015; the entire contents of the Korean Patent Application are incorporated herein by reference.

BACKGROUND OF THE INVENTION (a) Field of the Invention

The present invention is related to a backlight unit and a liquid display device that includes the backlight unit.

(b) Description of Related Art

A display device, such as a liquid crystal display device, may include a display panel and a backlight unit for providing light to the display panel. A curved display device may have a curved display panel for enhancing viewer experience and may have a backlight unit for providing light to the curved display unit.

In a curved display device, light provided by the backlight unit may not sufficiently reach edge portions of the curved display panel. As a result, images displayed by the curved display device may have relatively darker portions at the edge portions of the curved display panel, such that the quality of the images may not be satisfactory.

For sufficiently illuminating edge portions of the curved display panel, additional light sources may be deployed in the backlight unit. The additional light sources may incur additional cost associated with the curved display device.

The above information disclosed in this Background section is for enhancement of understanding of the background of the invention. The Background section may contain information that does not form the prior art that is already known in this country to a person of ordinary skill in the art.

SUMMARY

Embodiments of the present invention may be related to a backlight unit that may satisfactorily illuminate a display panel. Embodiments of the invention may be related to a display device that includes the backlight unit.

An embodiment of the present invention may be related to a backlight unit. The backlight unit may include a wall and a plurality of light sources. The wall may have a first side in a cross-sectional view of the backlight unit. The first side may have a curved shape in the cross-sectional view of the backlight unit. The plurality light sources may include a first light source and a second light source. The second light source may be positioned farther away from a center portion of the wall (and from a center of the first side) than the first light source in the cross-sectional view of the backlight unit. A minimum distance between the second light source and the first side may be greater than a minimum distance between the first light source and the first side in the cross-sectional view of the backlight unit.

The plurality light sources may include a third light source. The third light source may be positioned farther away from the center portion of the wall (and from the center of the first side) than the first light source in the cross-sectional view of the backlight unit. The third light source may be positioned closer to the center portion of the wall (and to the center of the first side) than the second light source in the cross-sectional view of the backlight unit. The minimum distance between the second light source and the first side may be greater than a minimum distance between the third light source and the first side in the cross-sectional view of the backlight unit.

The minimum distance between the third light source and the first side may be greater than the minimum distance between the first light source and the first side in the cross-sectional view of the backlight unit.

The minimum distance between the third light source and the first side may be equal to the minimum distance between the first light source and the first side in the cross-sectional view of the backlight unit.

The wall may have a second side, a third side, and fourth side in the cross-sectional view of the backlight unit. The first side may be positioned between the third side and the fourth side in the cross-sectional view of the backlight unit. The second side may be directly connected to each of the third side and the fourth side. A distance between the first side and the second side at the center portion of the wall may be less than each of a length of the third side and a length of the fourth side in the cross-sectional view of the backlight unit.

No light source may exist between the third side and the second light source in the cross-sectional view of the backlight unit.

A curvature of the first side may be unequal to a curvature of the second side in the cross-sectional view of the backlight unit.

The curvature of the second side may be less than the curvature of the first side and may be greater than 0 in the cross-sectional view of the backlight unit. The curvature of the second side may be 0 in the cross-sectional view of the backlight unit.

The second side may have a step structure, which may include a first portion and a second portion. A minimum distance between the second portion and the first side may be greater than a minimum distance between the first portion and the first side. The first light source may be positioned at (and on) the first portion in the cross-sectional view of the backlight unit. The second light source may be positioned at (and on) the second portion in the cross-sectional view of the backlight unit.

A curvature of the second portion may be equal to a curvature of the first portion in the cross-sectional view of the backlight unit.

A curvature of the second portion may be equal to a curvature of the first side in the cross-sectional view of the backlight unit.

A curvature of the first portion may be equal to a curvature of the first side in the cross-sectional view of the backlight unit.

The plurality of light sources may include a third light source. The third light source may be positioned at (and on) the first portion and may be positioned farther away from the center portion of the wall than the first light source in the cross-sectional view of the backlight unit. The minimum distance between the second light source and the first side may be greater than a minimum distance between the third light source and the first side in the cross-sectional view of the backlight unit.

The minimum distance between the third light source and the first side may be equal to the minimum distance between the first light source and the first side in the cross-sectional view of the backlight unit.

An embodiment of the present invention may be related to a backlight unit. The backlight unit may include a light processing sheet, which may have a curved side. The backlight unit may further include a plurality light sources, which may include a first light source and a second light source. The second light source may be positioned farther away from a center of the light processing sheet (and from a center of the curved side) than the first light source. A minimum distance between the second light source and the light processing sheet (or the curved side) may be greater than a minimum distance between the first light source and the light processing sheet (or the curve side).

The backlight unit may include a supporting portion, which may be configured to support the plurality of light sources. An edge of the light processing sheet and a corresponding edge of the supporting portion may be positioned at a same side with respect to the center of the light processing sheet. A minimum distance between the edge of the light processing sheet and the edge the supporting portion may be greater than a minimum distance between the center of the light processing sheet and a center of the supporting portion. The display device may include a reflector, which may be configured to reflect light that is emitted by the plurality of light sources. The reflector may substantially conform to the supporting portion. A structure of the reflector may be substantially identical to or analogous to a structure of the supporting portion.

The backlight unit may include a supporting portion, which may be configured to support the plurality of light sources. The supporting portion may have a step structure, which may include a first portion and a second portion. A minimum distance between the second portion and the light processing sheet may be greater than a minimum distance between the first portion and the light processing sheet. The first light source may be positioned at (and on) the first portion. The second light source may be positioned at (and on) the second portion. The display device may include a reflector, which may be configured to reflect light that is emitted by the plurality of light sources. The reflector may substantially conform to the supporting portion. A structure of the reflector may be substantially identical to or analogous to a structure of the supporting portion.

An embodiment of the present invention may be related to a display device. The display device may include a display panel, which may have a curved side. The display device may further include a plurality light sources, which may include a first light source and a second light source. The second light source may be positioned farther away from a center of the display panel (and from a center of the curved side) than the first light source. A minimum distance between the second light source and the display panel (or the curved side) may be greater than a minimum distance between the first light source and the display panel (or the curved side).

The display device may include a supporting portion configured to support the plurality of light sources. An edge of the display panel and a corresponding edge of the supporting portion may be positioned at a same side with respect to the center of the display panel. A minimum distance between the edge of the display panel and the edge the supporting portion may be greater than a minimum distance between the center of the display panel and a center of the supporting portion. The display device may include a reflector, which may be configured to reflect light that is emitted by the plurality of light sources. The reflector may substantially conform to the supporting portion. A structure of the reflector may be substantially identical to or analogous to a structure of the supporting portion.

The supporting portion may overlap at least a half of the display panel. A curvature of the display panel may be greater than a curvature of the supporting portion.

An embodiment of the present invention may be related to a curved backlight unit, which may include the following elements: a light source module including a plurality of light sources for emitting light and including a printed circuit board electrically connected to the plurality of light sources; and a bottom chassis including a bottom for supporting the light source module, wherein the plurality of light sources includes a first light source and a second light source, wherein the first light source is positioned at a center portion of the bottom, wherein the second light source is positioned at an edge portion of the bottom, wherein an optical distance of the second light source is longer than an optical distance of the first light source.

The bottom chassis may further include a first side wall portion, a second side wall portion, a third side wall portion, and a fourth side wall portion, which extend upward from for edges of the bottom and are connected to each other to form an enclosure for receiving the light source module, and a side edge of the first side wall portion may extend higher than a center portion of the first side wall portion.

The bottom may have a constant curvature.

A lower side of each of the first side wall portion and the second side wall portion may have a first curvature. An upper side of each of the first side wall portion and the second side wall portion may have a second curvature. The first curvature may be unequal to the second curvature.

The first curvature may be equal to a curvature of the bottom. The second curvature may be larger than the first curvature.

Each of the third side wall portion and the fourth side wall portion (which face the third side wall portion) may have a constant height with respect to an edge of the bottom.

The bottom portion may be flat. Each of the first side wall portion and the second side wall portion may have a curved side.

Each of the first side wall portion and the second side wall portion may have a flat lower side and a curved upper side.

The bottom may have a step structure.

The lower side of each of the first side wall portion and the second side wall portion may have a step structure.

The curvature of the upper side may be equal to a curvature of the lower side for each of the first side wall portion and the second side wall portion.

The plurality of light sources may include a light emitting diode (LED) or a cold cathode fluorescent lamp (CCFL).

A reflector may be provided between the bottom chassis and the light source array.

A curvature of the reflector may be equal to the curvature of the bottom.

The curved backlight unit may further include: a light processing member, which may overlap and/or may be positioned on the light source module to increase efficiency of light radiated from the light source module.

The light processing member may include a diffuser sheet and a plurality of optical sheets.

An embodiment of the present invention may be related to a curved display device, which may include the following components: a display panel for displaying an image; and a curved backlight unit for providing light to the display panel. A curvature of the display panel may be equal to a curvature of at least an element of the curved backlight unit. The curved backlight unit may include the following elements: a light source module including a plurality of light sources emitting light and including a printed circuit board electrically connected to the plurality of light sources; and a bottom chassis including a bottom for supporting the light source module. The plurality of light sources includes a first light source and a second light source. The first light source is positioned at a center portion of the bottom. The second light source is positioned at an edge portion of the bottom. An optical distance from the second light source to the display panel is longer than an optical distance of the first light source to the display panel.

The backlight unit may have one or more of the aforementioned structures.

According to embodiments of the present invention, the optical distances at two edge portions of a backlight unit may be longer than the optical distance at the center of the backlight unit. Therefore, light emitted at the two edge portions of the backlight unit may sufficiently diverge (or expand) to substantially fully illuminate the corresponding edge portions of a display panel. Advantageously, the edge portions of the display panel may have sufficient brightness, such that quality of images displayed by the display panel may be satisfactory.

Embodiments of the present invention may enable minimization of the number of light sources deployed at two edge portions of a backlight unit while maintaining satisfactory illumination provided by the backlight unit. Advantageously, the production cost associated with the backlight unit (and the related display device) may be minimized.

DETAILED DESCRIPTION OF THE EMBODIMENTS

Figure 1:
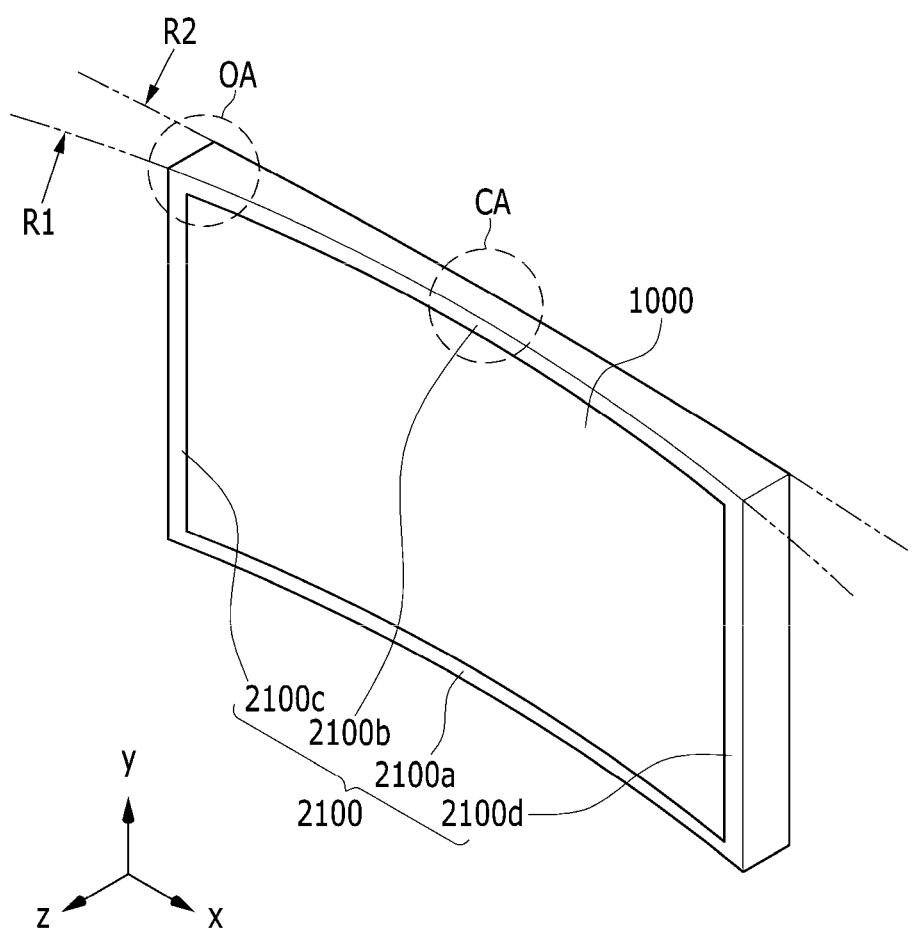
FIG. 1 shows a schematic perspective view illustrating a display panel and a bottom chassis of a curved display device according to an embodiment of the present invention.

Embodiments of the present invention are described with reference to the accompanying drawings. As those skilled in the art would realize, the described embodiments may be modified in various different ways, all without departing from the spirit or scope of the present invention.

Although the terms "first", "second", etc. may be used herein to describe various elements, these elements, should not be limited by these terms. These terms may be used to distinguish one element from another element. Thus, a first element discussed below may be termed a second element without departing from the teachings of the present invention. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In the drawings, thicknesses of layers, films, panels, regions, etc., may be exaggerated for clarity. When a first element (such as a layer, film, region, or substrate) is referred to as being "on" a second element, the first element can be directly on the second element, or one or more intervening elements may also be present. In contrast, when a first element is referred to as being "directly on" a second element, there are no intended intervening elements between the first element and the second element.

Figure 2:
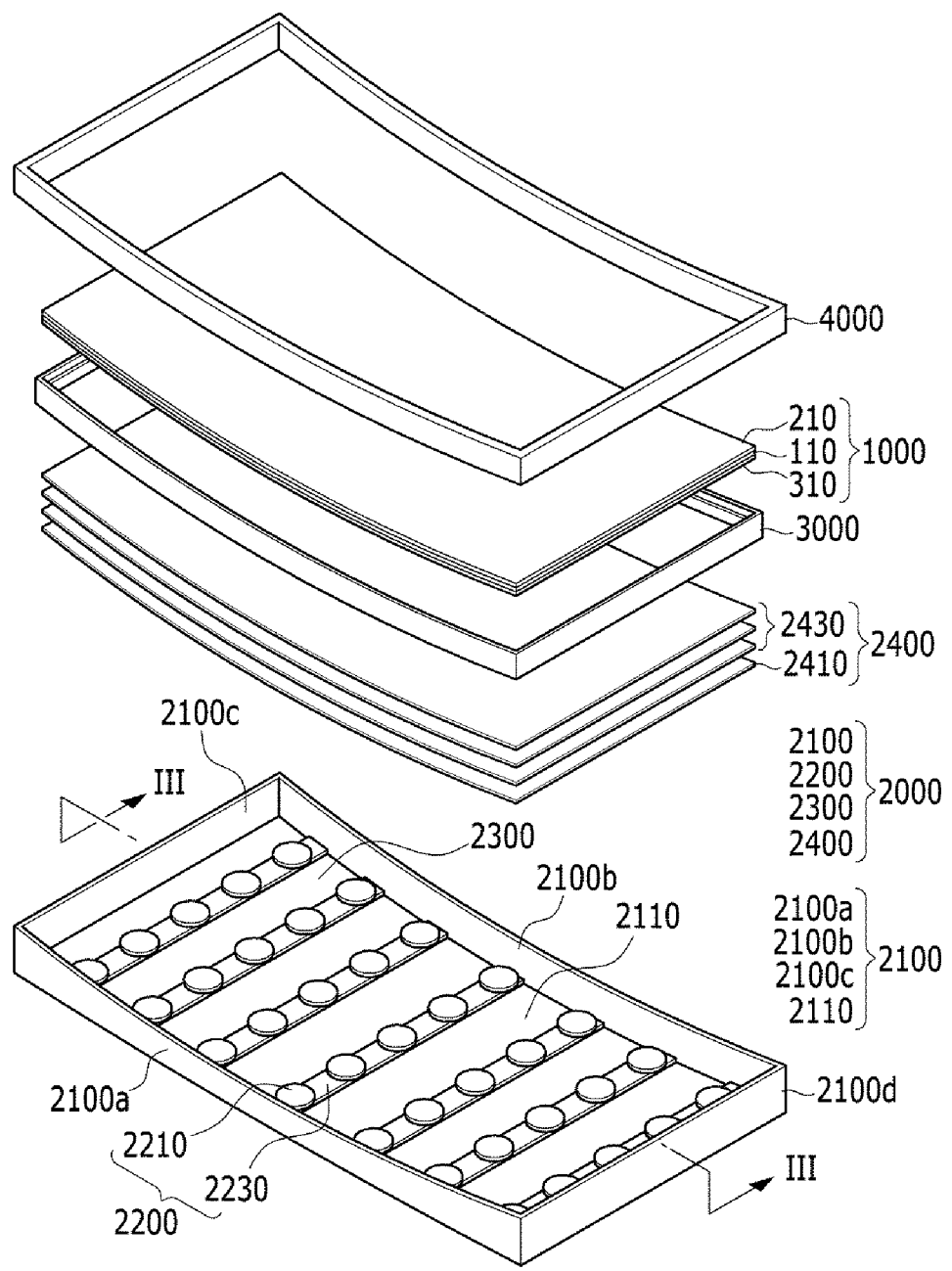
FIG. 2 shows a schematic exploded (perspective) view illustrating some components of a curved display device according to an embodiment of the present invention.
Figure 3:
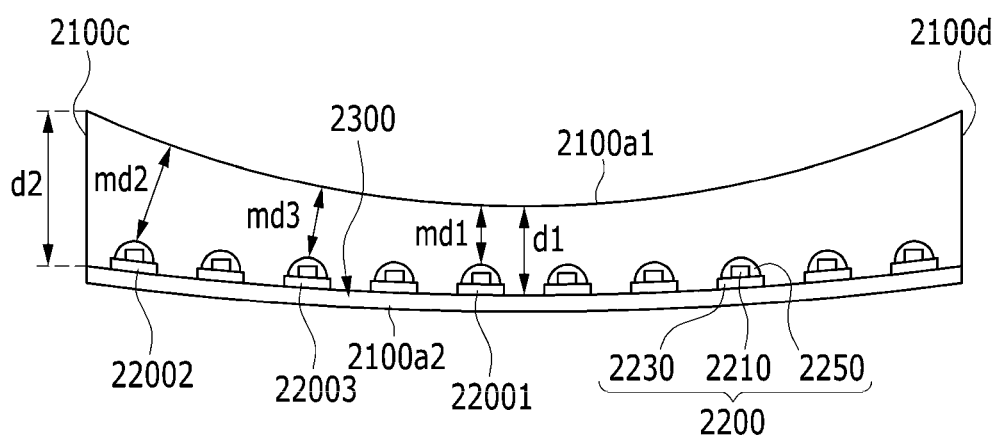
FIG. 3 shows a schematic cross-sectional view illustrating a backlight unit according to an embodiment of the present invention.

FIG. 1 shows a schematic perspective view illustrating a display panel 1000 and a bottom chassis 2100 of a curved display device according to an embodiment of the present invention. FIG. 2 shows a schematic exploded (perspective) view illustrating some components of the curved display device according to an embodiment of the present invention. FIG. 3 shows a schematic cross-sectional view taken along the line III-III indicated in FIG. 2 for illustrating a backlight unit according to an embodiment of the present invention.

Referring to FIGS. 1 to 3, the curved display device includes a display panel 1000, a curved backlight unit 2000, a mold frame 3000, and a curved frame 4000. The display panel 1000 may be concavely from a perspective of an intended view point. The display panel 1000 may have a curved side that has a constant curvature with respect to an XY plane.

The display panel 1000 may be, for example, one of a liquid crystal display panel, a plasma display panel, an organic light emitting display panel, etc. According to an embodiment of the present invention, the display panel 1000 is a liquid crystal display panel and includes a lower panel 310 (or back panel 310), an upper panel 210 (or front panel 210) overlapping the lower panel 310, and a liquid crystal layer 110 interposed between the lower panel 310 and the upper panel 210.

Each of the lower panel 310 and the upper panel 210 may have a constant curvature. The curvature of the lower panel 310 may be substantially equal to the curvature of the upper panel 210. A curvature radius associated with the upper panel 210 and an intended viewer position may be at a same side with respect to the upper panel 210.

The display panel 1000 may be curved prior to being inserted into the curved frame 4000 (which may have a constant curvature) or may be curved after being inserted into the curved frame 4000. For example, if the display panel 1000 is a flexible type, the display panel 1000 may be curved after being inserted into the curved frame 4000. If the display panel 1000 is a rigid type, the display panel 1000 may be manufactured to have a curved shape prior to being inserted into the curved frame 4000.

The lower panel 310 includes a transparent insulating substrate (e.g., a glass substrate), a plurality of thin film transistors, a data line, a gate line, a pixel electrode, and etc. A source terminal of the thin film transistor is connected to the data line and the gate terminal of the thin film transistor is connected to the gate line. The drain terminal of the thin film transistor is connected to the pixel electrode, which may be made of a transparent conductive material such as indium tin oxide (ITO).

The upper panel 120 overlaps the lower panel 310 and includes a transparent insulating substrate, color filters, a common electrode, etc. The color filters may represent primary colors, such as red, green, and blue. The common electrode is made of a transparent conductive material, such as at least one of indium tin oxide (ITO) and indium zinc oxide (IZO). In an embodiment, at least one of the color filter and the common electrode may also be positioned on the lower panel 310.

The lower panel 310 and the upper panel 120 may be each attached with a polarizer. Each polarizer may transmit only light vibrating in one direction.

In the liquid crystal display panel, when the thin film transistor is turned on by the signal applied to the gate line, the signal applied to the data line is applied to the pixel electrode. As a result, an electric field is formed between the pixel electrode and the common electrode to control orientations of liquid crystal molecules of the liquid crystal layer 110. Therefore, transmittance of light passing through the liquid crystal layer 110 is controlled for displaying an image.

The display device includes at least one driving device (not illustrated), such as a driver for controlling a signal applied to the display panel 1000, and a controller. The driving device may be mounted in the display panel 1000 in an IC chip type or may be mounted in a printed circuit board (PCB) or a flexible printed circuit board (FPCB). The driving device may be electrically connected to the display panel 1000. The driving device may be integrated in the display panel 1000.

The display panel 1000 may overlap the curved backlight unit 2000. The curved backlight unit 2000 may provide light to the display panel 1000.

The curved backlight unit 2000 may include a light processing member 2400, which may include light processing sheets, such as a diffuser sheet 2410 and a plurality of optical sheets 2430. The curved backlight unit 2000 may include a bottom chassis 2100, which may support a light source module 2200, a reflector 2300, and light source module 2200.

The bottom chassis 2100 may be a container that has an opening and encloses a receiving space. The bottom chassis 2100 may have, for example, a shape of a generally quadrangular tray. The bottom chassis 2100 may include a bottom 2110 and a first side wall portion 2100a, a second side wall portion 2100b, a third side wall portion 2100c, and a fourth side wall portion 2100d which extend upward from each corner of the bottom 2110.

The bottom 2110 may support a plurality of light sources (or light source modules), such as a light source 2200 (or light source module 2200), which may provide light to the display panel 1000.

The first side wall portion 2100a and the second side wall portion 2100b face each other, and the third side wall portion 2100c and the fourth side wall portion 2100d face each other.

In an embodiment, the first side wall portion 2100a and the second side wall portion 2100b face each other in parallel with each other in a Y-axis direction, and the third side wall portion 2100c and the fourth side wall portion 2100d face each other in parallel with each other in an X-axis direction. In an embodiment, the first side wall portion 2100a and the second side wall portion 2100b are formed to be concavely bent, having a constant curvature in a Z direction, that is, when viewed from an XY plane and the third side wall portion 2100c and the fourth side wall portion 2100d may be formed flat, without being bent.

An upper side 2100a1 (i.e., a curved side 2100a1) of the first side wall portion 2100a and the second side wall portion 2100b may have a first curvature R1 and a lower side 2100a2 of the first side wall portion 2100a and the second side wall portion 2100b may have a second curvature R2. In this case, the first curvature R1 may be formed to be larger than the second curvature R2.

An edge height d2 of the wall 2100a or 2100b (i.e., an edge distant d2 from an edge of the bottom 2110 to an edge of the upper side 2100a1 of the wall 2100a or 2100b) may be larger than a center height d1 of the wall 2100a or 2100b (i.e., a center distant d1 from a center of the bottom 2110 to a center of the upper side 2100a1 of the wall 2100a or 2100b).

The bottom 2110 may support the light source modules. An optical distance of a light source module positioned at an edge of the bottom 2110 may be longer than an optical distance of a light source module positioned at a center of the bottom 2110.

Each of the third side wall portion 2100c and the fourth side wall portion 2100d may have a constant height with respect to the bottom 2110. An Each of the first side wall portion 2100a and the second side wall portion 2100b may be concave, may have a constant curvature in the Z direction; when viewed from the XY plane, each of the third side wall portion 2100c and the fourth side wall portion 2100d may be flat. In an embodiment, each of the third side wall portion 2100c and the fourth side wall portion 2100d may be concave, may have a constant curvature in the Z direction; when viewed from the XY plane, each of the first side wall portion 2100a and the second side wall portion 2100b may be flat.

The bottom chassis 2100 may be made of metal materials, such as one or more of aluminum, aluminum alloy, zinc plated steel, etc. The bottom chassis 2100 according to an embodiment of the present invention may be made of a plastic material such as polycarbonate (PC).

The bottom chassis 2100 has the light source module 2200 received therein. The light source module 2200 may include a printed circuit board 2230 which is disposed on the bottom 2110 of the bottom chassis 2100 and a plurality of light sources 2210 which is mounted on the printed circuit board 2230.

The light source 2210 may be a light emitting diode (LED) package and a light emitting surface of the LED package is mounted on the printed circuit board 2230 to be toward display panel 1000.

The light source 2210 may be configured of a colored LED or a white LED which emits at least one of colors such as red, blue, and green. Further, the colored LED may include at least one of the red LED, the blue LED, and the green LED and the disposition of the light emitting diode and light emitted from the light emitting diode may be variously changed and applied. Further, the light source 2210 may be a cold cathode fluorescent lamp (CCFL).

The printed circuit board 2230 may have an elongated bar shape. The printed circuit board 2230 supplies power to the light source 2210 while supporting the light source 2210. The printed circuit board 2230 may be a metal core printed circuit board (MCPCB) which may rapidly radiate heat generated from the light source 2210. The light source 2210 is electrically connected to a wiring of the printed circuit board 2230 to be supplied with power, thereby converting electric energy into light energy and emitting the light energy. At least one light source 2210 may be disposed on one printed circuit board 2230 and the total number of light sources 2210 and the disposition of the light source 2210 may be variously changed depending on a size of the display panel, an output of the light source, and the like.

An optical lens 2250 is mounted on the printed circuit board 2230. The optical lens 2250 may substantially cover the light source 2210. Light emitted from the light source 2210 may be refracted, expanded, and/or diffused by the optical lens 2250. The optical lens 2250 may enable minimization of the number and/or power consumption of light sources 2210.

In an embodiment, an optical lens 2250 may be a side emitting lens which mainly refracts and diffuses the upward light from the light source 2210 to a side direction. In an embodiment, the optical lens 2250 may be a top emitting mainly lens which refracts and diffuses the light from the light source 2210 to a top direction. The side emitting lens may substantially reduce the optical distance; therefore, an optical sheet 2430 may be positioned substantially close to the light source 2210, such that the overall thickness of the curved backlight unit 2000 (and the associated display device) may be advantageously minimized.

In an embodiment, a combination of a light source 2210, an optical lens 2250, and a portion of a printed circuit board 2230 may form a light source module 2200. In an embodiment, the number of light source modules 2200 may be greater than or equal to the number of printed circuit boards 2230.

Although not illustrated, the bottom chassis 2100 may include a plurality of supporting members for supporting the light processing member 2400. The plurality of supporting members may be disposed at the bottom 2110 of the bottom chassis 2100 at a predetermined interval. The supporting members may have various heights with respect to the bottom 2110. The distribution of the heights of the supporting members may conform to (i.e., may be consistent with) the curvature of the light processing member 240 and/or the curvature of the first side 2100a1 of the wall portion 2100a.

A reflector 2300 is positioned on the bottom chassis 2100. The reflector 2300 reflects light emitted from the optical lens 2250 and light reflected from another structure such as the diffuser sheet 2410 and finally directs the light to the display panel 1000, thereby serving to increase light efficiency.

The reflector 2300 may generally have a structure in which it is seated on the inner surface of the bottom chassis 2100, that is, on the bottom 2110. The reflector 2300 may have the same curvature as the bottom 2110.

The reflector 2300 may be made of one or more plastic materials, such as polyethylene terephthalate (PET), polycarbonate (PC), and/or polystyrene (PS). The reflector 2300 may also include a light reflective material such as titanium dioxide $TiO_2$ to increase light reflectivity.

A space between the reflector 2300 and the diffuser sheet 2410 may be an optical space of the backlight unit 2000.

The light processing member 2400 may increase the light efficiency radiated from the light source module 2200. The diffuser sheet 2410 diffuses light radiated from the light source module 2200 and radiates the diffused light to the optical sheet 2430. The optical sheet 2430 is positioned on the diffuser sheet 2410 to increase the efficiency of light incident from the diffuser sheet 2410.

The light processing member 2400 is positioned on the bottom chassis 2100 and the reflector 2300. Therefore, the edge of the light processing member 2400 may be positioned on the side wall portions 2100a, 2100b, 2100c, and 2100d of the bottom chassis 2100.

The light processing member 2400 may be concave, having the same curvature as the upper side 2100a1 of the first side wall portion 2100a and the second side wall portion 2100b.

The diffuser sheet 2410 may scatter light. The optical sheet 2430 includes a prism sheet which condenses light by controlling a propagation direction of light uniformly diffused using the diffuser sheet 2410 to increase luminance and a protecting sheet used to protect a prism of the prism sheet from being scratched, and the like. The protecting sheet may serve to diffuse light so as to expand a viewing angle which narrows by the prism sheet.

The optical sheet 2430 may include a plurality of prism sheets and/or a plurality of protecting sheets. The optical sheet 2430 may further include an optical sheet having other characteristics. For example, the optical sheet 2430 may include a reflective polarization sheet which may separate, transmit, and/or reflect light to increase luminous efficiency.

Although not illustrated, a lower surface of the bottom chassis 2100 may be mounted with an inverter board which is a printed circuit board for power supply and/or a printed circuit board for converting a signal. The inverter board may transform external power into a predetermined voltage level and provide the power to the light source 2210. The printed circuit board for converting a signal may convert an analog data signal into a digital data signal and provide the converted digital data signal to the display panel 1000 through a flexible circuit board (not illustrated) which is attached to the display panel 1000.

The display device may include a mold frame 3000 which stably fixes the display panel 1000 to the curved backlight unit 2000, with a predetermined height.

The mold frame 3000 may have substantially a cuboid square frame of which the upper and lower portions are opened. The mold frame 300 may be coupled with the bottom chassis 2100 in such a manner that it is locked to hooks (not illustrated) which may be positioned at the side wall portions 2100a, 2100b, 2100c, and 2100d, while enclosing, for example, the side wall portions 2100a, 2100b, 2100c, and 2100d of the bottom chassis 2100. In this case, the mold frame 3000 may also be concave, having the same curvature as the upper side 2100a1 of the first side wall portion 2100a and the second side wall portion 2100b.

The display panel 1000 is fixed on the mold frame 3000. The display panel 1000 may be attached to an upper surface of the mold frame 3000 by an adhesive member (not illustrated) which may be a cushion double-sided adhesive tape having buffering capability to reduce an impact which may be applied to the display panel 1000.

The curved frame 4000 may be installed to enclose an edge of the display panel 1000. According to an embodiment of the present invention, the mold frame 3000 and the curved frame 4000 may be omitted.

Referring to FIG. 3, the backlight unit 2000 may include the wall 2100a and a plurality of light sources (or light source modules), e.g., a light source 2200 (or light source module 2200). The wall 2100a may have a first side 2100a1 in the cross-sectional view of the backlight unit 2000. The first side 2100a1 may have a curved shape in the cross-sectional view of the backlight unit 2000. The plurality light sources may include a light source 22001 (or light source module 22001) and a light source 22002 (or light source module 22002). The light source 22002 may be positioned farther away from a center portion CA of the wall 2100a (and from a center of the first side 2100a1) than the light source 22001 in the cross-sectional view of the backlight unit 2000. A minimum distance md2 between the light source 22002 and the first side 2100a1 may be greater than a minimum distance md1 between the light source 22001 and the first side 2100a1 in the cross-sectional view of the backlight unit 2000.

The plurality light sources may include a light source 22003 (or light source module 22003). The light source 22003 may be positioned farther away from the center portion CA of the wall 2100a (and from the center of the first side 2100a1) than the light source 22001 in the cross-sectional view of the backlight unit 2000. The light source 22003 may be positioned closer to the center portion CA of the wall 2100a (and to the center of the first side 2100a1) than the light source 22002 in the cross-sectional view of the backlight unit 2000. The minimum distance md2 between the light source 22002 and the first side 2100a1 may be greater than a minimum distance md3 between the light source 22003 and the first side 2100a1 in the cross-sectional view of the backlight unit 2000.

The minimum distance md3 between the light source 22003 and the first side 2100a1 may be greater than the minimum distance md1 between the light source 22001 and the first side 2100a1 in the cross-sectional view of the backlight unit 2000.

The wall 2100a may have a second side 2100a2, a third side (which may correspond to and/or be aligned with the wall 2100c), and fourth side (which may correspond to and/or be aligned with the wall 2100d) in the cross-sectional view of the backlight unit 2000. The first side 2100a1 may be positioned between the third side and the fourth side in the cross-sectional view of the backlight unit 2000. The second side 2100a2 may be directly connected to each of the third side and the fourth side. A distance d1 between the first side 2100a1 and the second side 2100a2 at the center portion of the wall 2100a may be less than each of a length d2 of the third side and a length d2 of the fourth side in the cross-sectional view of the backlight unit 2000.

No light source may exist between the third side (or the wall 2100c) and the light source 22002 in the cross-sectional view of the backlight unit 2000.

A curvature of the first side 2100a1 may be unequal to a curvature of the second side 2100a2 in the cross-sectional view of the backlight unit 2000.

The curvature of the second side 2100a2 may be less than the curvature of the first side 2100a1 and may be greater than 0 in the cross-sectional view of the backlight unit 2000.

The distance md2 may be sufficiently large, such that light emitted by the light source 22002 (and processed by the light processing member 2400) may substantially reach and illuminate edge portions OA of the display panel 1000. Advantageously, satisfactory image quality may be attained, and no additional light sources may be required.

Referring to FIG. 1, FIG. 2, and FIG. 3, a light process sheet (e.g., the diffuser sheet 2410 or an optical sheet 2430) of the back light unit 2000 may have a curve side. In a cross-sectional view of the backlight unit 2000, the curved side of the light processing sheet may have a structure analogous to the first side 2100a1 of the wall 2100a illustrated in FIG. 3. The light source 22002 may be positioned farther away from a center of the light processing sheet (and from a center of the curved side) than the light source 22001. A minimum distance (related to the distance md2) between the light source 22002 and the light processing sheet (or the curved side) may be greater than a minimum distance (related to the distance md1) between the light source 22001 and the light processing sheet (or the curve side).

The bottom 2110 (or supporting portion 2110) of the bottom chassis 2100 may be configured to support the light sources. An edge of the light processing sheet and a corresponding edge of the supporting portion 2110 may be positioned at a same side with respect to the center of the light processing sheet (e.g., left side in FIG. 3). A minimum distance (related to the distance d2) between the edge of the light processing sheet and the edge the supporting portion 2110 may be greater than a minimum distance (related to the distance d1) between the center of the light processing sheet and a center of the supporting portion 2110. The reflector 2300 may substantially conform to the supporting portion 2110. A structure of the reflector 2300 may be substantially identical to or analogous to a structure of the supporting portion 2110.

The display panel 1000 may have a curved side. In a cross-sectional view of the display device, the curved side of the display panel 1000 may have a structure analogous to the first side 2100a1 of the wall 2100a illustrated in FIG. 3. The light source 22002 may be positioned farther away from a center of the display panel (and from a center of the curved side) than the light source 22001. A minimum distance (related to the distance md2) between the light source 22002 and the display panel (or the curved side) may be greater than a minimum distance (related to the distance md1) between the light source 22001 and the display panel (or the curved side).

An edge of the display panel 1000 and a corresponding edge of the supporting portion 2110 may be positioned at a same side with respect to the center of the display panel (e.g., left side in FIG. 3). A minimum distance (related to the distance d2) between the edge of the display panel and the edge the supporting portion 2110 may be greater than a minimum distance (related to the distance d1) between the center of the display panel and a center of the supporting portion 2110. The display device may include a reflector 2300, which may be configured to reflect light that is emitted by the plurality of light sources. The supporting portion 2110 may overlap at least a half of the display panel. A curvature of the display panel 1000 may be greater than a curvature of the supporting portion 2110.

The distance md2 may be sufficiently large, such that light emitted by the light source 22002 (and processed by the light processing member 2400) may sufficiently expand to reach and illuminate edge portions OA of the display panel 1000. Advantageously, satisfactory image quality may be attained, and no additional light sources may be required.

Figure 4:
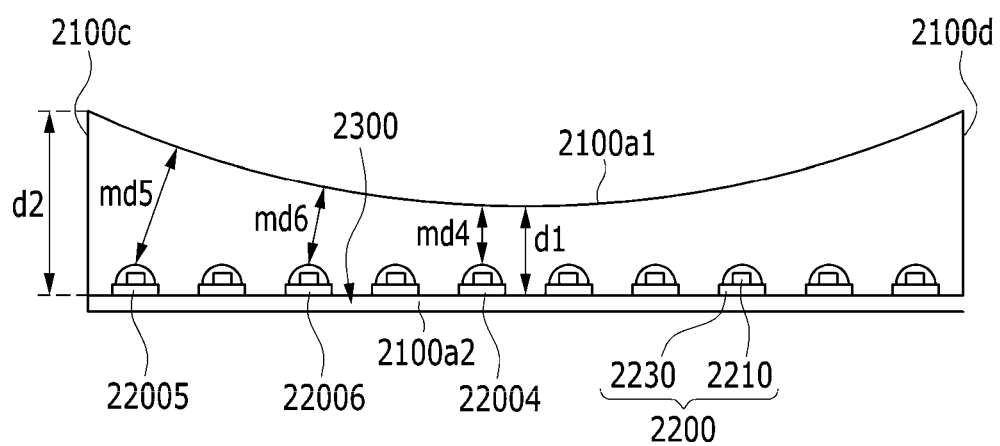
FIG. 4 shows a schematic cross-sectional view illustrating a backlight unit according to an embodiment of the present invention.

FIG. 4 shows a schematic cross-sectional view illustrating a backlight unit according to an embodiment of the present invention. The backlight unit may have features that are analogous to or identical to features of the same as the curved backlight unit 2000 described above with reference to FIGS. 1 to 3. Nevertheless, the structure of the bottom chassis 2100 may be different. Identical or analogous components may be denoted by the same reference numerals, and related description may not be repeated.

Referring to FIG. 4, the curved backlight unit may include the light source module 2200, the reflector 2300, and the bottom chassis 2100 receiving the light source module 2200.

The bottom chassis 2100 may include the bottom 2110 and the first side wall portion 2100a, the second side wall portion 2100b, the third side wall portion 2100c, and the fourth side wall portion 2100d which extend upward from each corner of the bottom 2110.

The bottom 2110 is provided with the light source module 2200 which provides light to the display panel 1000.

The first side wall portion 2100a and the second side wall portion 2100b face each other and the third side wall portion 2100c and the fourth side wall portion 2100d face each other.

In more detail, the first side wall portion 2100a and the second side wall portion 2100b face each other in parallel with each other in the Y-axis direction and, the third side wall portion 2100c and the fourth side wall portion 2100d face each other in parallel with each other in the X-axis direction. In this case, the first side wall portion 2100a and the second side wall portion 2100b are formed to be concavely bent, having a constant curvature in the Z direction, that is, when viewed from an XY plane and the third side wall portion 2100c and the fourth side wall portion 2100d may be formed flat, without being bent.

In particular, the upper side 2100a1 of the first side wall portion 2100a and the second side wall portion 2100b may have the predetermined curvature, but the lower side 2100a2 of the first side wall portion 2100a and the second side wall portion 2100b may be formed flat, no having a curvature.

The height from the bottom 2110 to the upper side 2100a1 of the first side wall portion 2100a and the second side wall portion 2100b may be formed to be higher at the outside d2 of the curved backlight unit 2000 than at the center d1 thereof The bottom 2110 is provided with the light source module 2200 and the optical distance of the light source module 2200 may be formed to be longer at the outside d2 of the curved backlight unit 2100 than at the center d1 thereof In this case, the display panel 1000 the mold frame 3000, and the curved frame 4000 which are formed on the curved backlight unit 2000 may be concave, having the same curvature as the upper side 2100a1 of the first side wall portion 2100a and the second side wall portion 2100b.

Referring to FIG. 4, the backlight unit may include the wall 2100a and a plurality of light sources (or light source modules), e.g., a light source 2200 (or light source module 2200). The wall 2100a may have a first side 2100a1 in the cross-sectional view of the backlight unit. The first side 2100a1 may have a curved shape in the cross-sectional view of the backlight unit. The plurality light sources may include a light source 22004 (or light source module 22004) and a light source 22005 (or light source module 22005). The light source 22005 may be positioned farther away from a center portion CA of the wall 2100a (and from a center of the first side 2100a1) than the light source 22004 in the cross-sectional view of the backlight unit. A minimum distance md5 between the light source 22005 and the first side 2100a1 may be greater than a minimum distance md4 between the light source 22004 and the first side 2100a1 in the cross-sectional view of the backlight unit.

The plurality light sources may include a light source 22006 (or light source module 22006). The light source 22006 may be positioned farther away from the center portion CA of the wall 2100a (and from the center of the first side 2100a1) than the light source 22004 in the cross-sectional view of the backlight unit. The light source 22006 may be positioned closer to the center portion CA of the wall 2100a (and to the center of the first side 2100a1) than the light source 22005 in the cross-sectional view of the backlight unit. The minimum distance md5 between the light source 22005 and the first side 2100a1 may be greater than a minimum distance md6 between the light source 22006 and the first side 2100a1 in the cross-sectional view of the backlight unit.

The minimum distance md6 between the light source 22006 and the first side 2100a1 may be greater than the minimum distance md4 between the light source 22004 and the first side 2100a1 in the cross-sectional view of the backlight unit.

The wall 2100a may have a second side 2100a2, a third side (which may correspond to and/or be aligned with the wall 2100c), and fourth side (which may correspond to and/or be aligned with the wall 2100d) in the cross-sectional view of the backlight unit. The first side 2100a1 may be positioned between the third side and the fourth side in the cross-sectional view of the backlight unit. The second side 2100a2 may be directly connected to each of the third side and the fourth side. A distance d1 between the first side 2100a1 and the second side 2100a2 at the center portion of the wall 2100a may be less than each of a length d2 of the third side and a length d2 of the fourth side in the cross-sectional view of the backlight unit.

No light source may exist between the third side (or the wall 2100c) and the light source 22005 in the cross-sectional view of the backlight unit.

A curvature of the first side 2100a1 may be unequal to a curvature of the second side 2100a2 in the cross-sectional view of the backlight unit.

The second side 2100a2 may be substantially flat, and the curvature of the second side 2100a2 may be 0 in the cross-sectional view of the backlight unit.

The distance md5 may be sufficiently large, such that light emitted by the light source 22005 (and processed by the light processing member 2400) may sufficiently expand to reach and illuminate edge portions OA of the display panel 1000. Advantageously, satisfactory image quality may be attained, and no additional light sources may be required.

Figure 5:
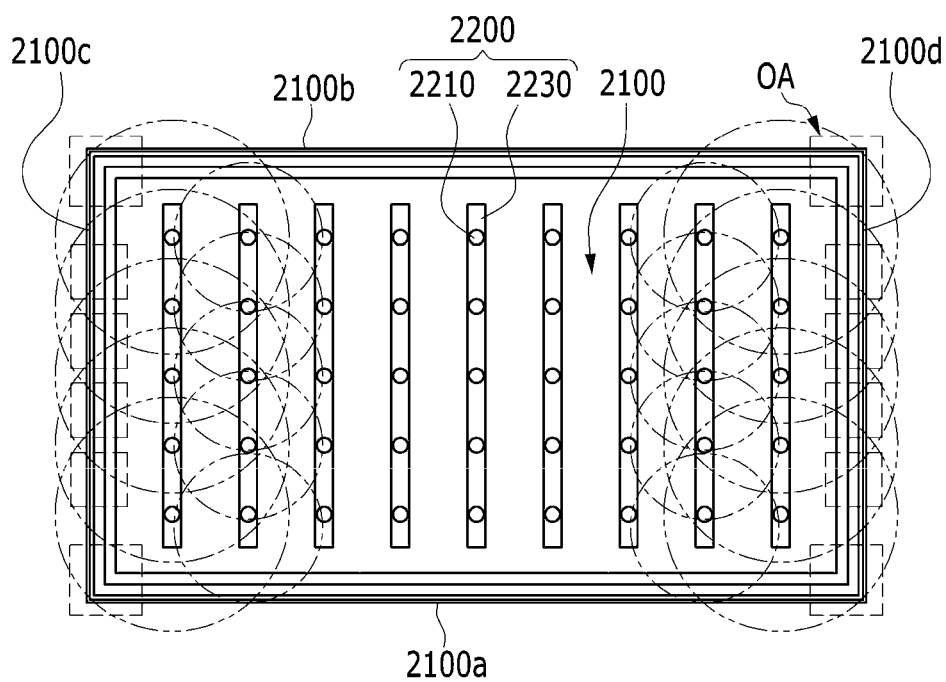
FIG. 5 shows a schematic plan view illustrating a backlight unit according to an embodiment illustrating the present invention.
Figure 6:
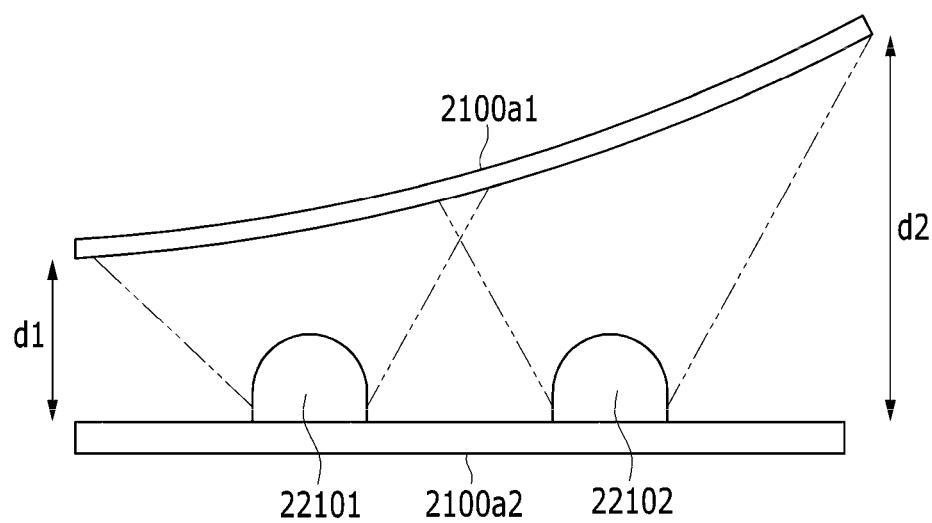
FIG. 6 shows a schematic cross-sectional view illustrating a portion of a backlight unit according to an embodiment of the present invention.

FIG. 5 shows a schematic plan view of a curved backlight unit according to an embodiment of the present invention. FIG. 6 shows a schematic cross-sectional view of a portion of the curved backlight unit according to an embodiment of the present invention. The curved backlight unit may have one or more of the features discussed with reference to FIG. 1, FIG. 2, FIG. 3, and/or FIG. 4

Referring to FIGS. 5 and 6, the curved backlight unit may have an optical distance closer to the previously discussed distance d1 than the previously discussed d2 at the center of the curved back light unit, and the curved back light unit may have an optical distance closer to the previously discussed distance d2 than the previously discussed distance d1 at/near an edge portion OA of the curved backlight unit. The optical distance of a light source 22102 positioned at the edge portion may be greater than the optical distance of a light source 22101 positioned at the center and may enable sufficient light divergence (or light expansion), such that an edge of an associated display panel may be sufficiently illuminated. No extra light sources may be required for illuminating the edge of the display panel.

Figure 7:
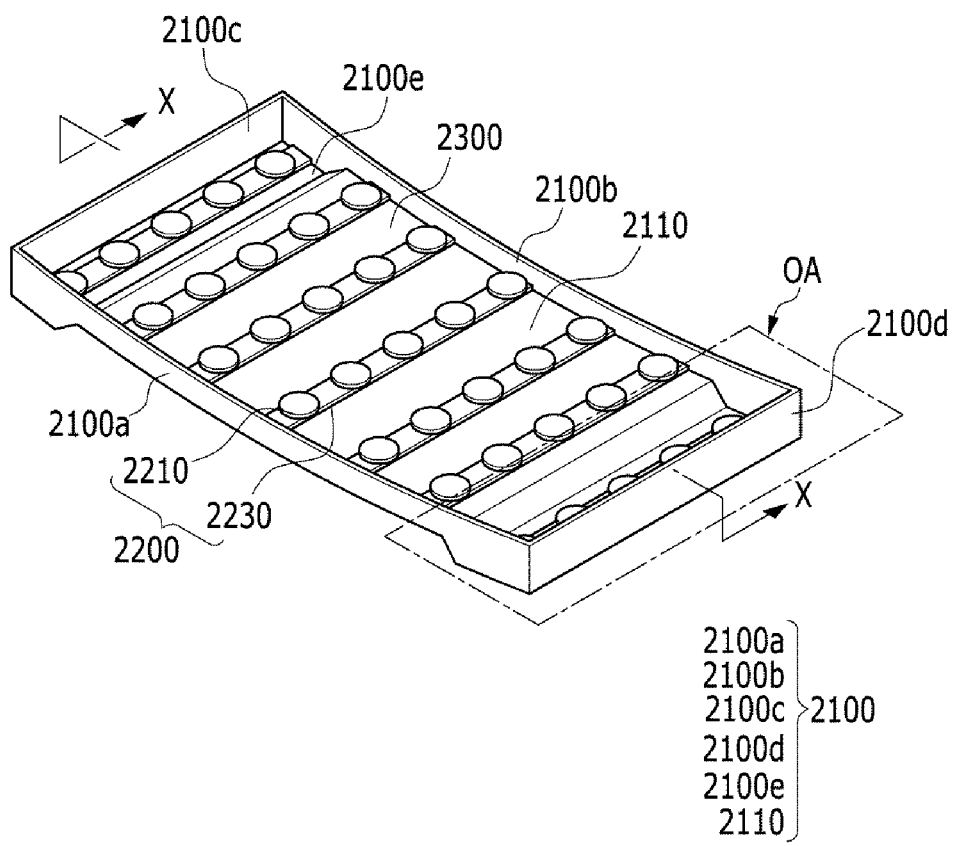
FIG. 7 shows a schematic perspective view illustrating a backlight unit according to an embodiment of the present invention.
Figure 8:
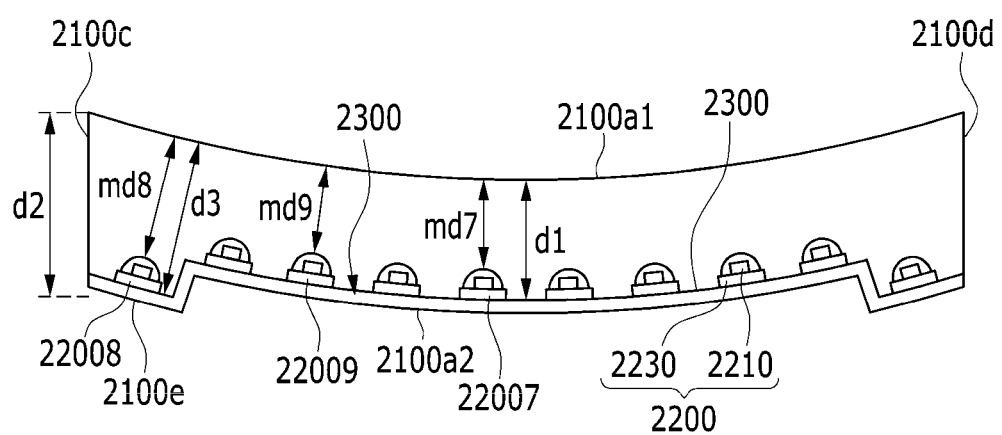
FIG. 8 shows a schematic cross-sectional view illustrating a backlight unit according to an embodiment of the present invention.

FIG. 7 shows a schematic perspective view of a curved backlight unit according to an embodiment of the present invention. FIG. 8 shows a schematic cross-sectional view of the curved backlight unit according to an embodiment of the present invention taken along the line X-X indicated in FIG. 7. The curved backlight unit illustrated in FIGS. 7 and 8 may have one or more of the features discussed with reference to FIGS. 1 to 6. In an embodiment, the backlight unit may have a step portion 2100e at the bottom chassis 2100. Identical or analogous components may be denoted by same reference numerals, and related description may not be repeated.

Referring to FIGS. 7 and 8, the curved backlight unit may include the light source module 2200, the reflector 2300, and the bottom chassis 2100, which accommodates the light source module 2200 and the reflector 2300.

The bottom chassis 2100 may include the bottom 2110, the first side wall portion 2100a, the second side wall portion 2100b, the third side wall portion 2100c, the fourth side wall portion 2100d which extend upward from each corner of the bottom 2110, and the step portion 2100e.

Two step portions 2100e may be positioned at two edges of the bottom 2110 and may be adjacent to the third side wall portion 2100c and the fourth side wall portion 2100d, respectively.

Given a step portion 2100e the distance d2 between an edge of the bottom 2110 and an edge of the first side 2100a1 may be longer than the distance d1 between the center of the bottom 2110 and the center of the first side 2100a1. As a result, light emitted by a light source 22008 positioned at the step portion 2100e may have a sufficiently expand to illuminate a sufficiently large area, such that no unwanted dark part may appear at the corresponding edge portion of an associated display panel.

Referring to FIG. 8, the backlight unit may include the wall 2100a and a plurality of light sources (or light source modules), e.g., a light source 2200 (or light source module 2200). The wall 2100a may have a first side 2100a1 in the cross-sectional view of the backlight unit. The first side 2100a1 may have a curved shape in the cross-sectional view of the backlight unit. The plurality light sources may include a light source 22007 (or light source module 22007) and a light source 22008 (or light source module 22008). The light source 22008 may be positioned farther away from a center portion of the wall 2100a (and from a center of the first side 2100a1) than the light source 22007 in the cross-sectional view of the backlight unit. A minimum distance md8 between the light source 22008 and the first side 2100a1 may be greater than a minimum distance md7 between the light source 22007 and the first side 2100a1 in the cross-sectional view of the backlight unit.

The plurality light sources may include a light source 22009 (or light source module 22009). The light source 22009 may be positioned farther away from the center portion of the wall 2100a (and from the center of the first side 2100a1) than the light source 22007 in the cross-sectional view of the backlight unit. The light source 22009 may be positioned closer to the center portion of the wall 2100a (and to the center of the first side 2100a1) than the light source 22008 in the cross-sectional view of the backlight unit. The minimum distance md8 between the light source 22008 and the first side 2100a1 may be greater than a minimum distance md9 between the light source 22009 and the first side 2100a1 in the cross-sectional view of the backlight unit.

The minimum distance md9 between the light source 22009 and the first side 2100a1 may be equal to the minimum distance md7 between the light source 22007 and the first side 2100a1 in the cross-sectional view of the backlight unit.

The wall 2100a may have a second side 2100a2, a third side (which may correspond to and/or be aligned with the wall 2100c), and fourth side (which may correspond to and/or be aligned with the wall 2100d) in the cross-sectional view of the backlight unit. The first side 2100a1 may be positioned between the third side and the fourth side in the cross-sectional view of the backlight unit. The second side 2100a2 may be directly connected to each of the third side and the fourth side. A distance d1 between the first side 2100a1 and the second side 2100a2 at the center portion of the wall 2100a may be less than each of a length d2 of the third side and a length d2 of the fourth side in the cross-sectional view of the backlight unit.

No light source may exist between the third side (or the wall 2100c) and the light source 22008 in the cross-sectional view of the backlight unit.

The second side 2100a2 may have a step structure, which may include a first portion and a second portion. The first portion may be larger than the second portion. A minimum distance (related to the distance d3) between the second portion and the first side 2100a1 may be greater than a minimum distance (related to the distance d1) between the first portion and the first side 2100a1. The light source 22007 may be positioned at (and on) the first portion in the cross-sectional view of the backlight unit. The light source 22008 may be positioned at (and on) the second portion in the cross-sectional view of the backlight unit.

A curvature of the second portion may be equal to a curvature of the first portion in the cross-sectional view of the backlight unit.

A curvature of the second portion may be equal to a curvature of the first side 2100a1 in the cross-sectional view of the backlight unit.

A curvature of the first portion may be equal to a curvature of the first side 2100a1 in the cross-sectional view of the backlight unit.

The light source 22009 may be positioned at (and on) the first portion and may be positioned farther away from the center portion of the wall 2100a than the light source 22007 in the cross-sectional view of the backlight unit. The minimum distance md8 between the light source 22008 and the first side 2100a1 may be greater than the minimum distance md9 between the light source 22009 and the first side 2100a1 in the cross-sectional view of the backlight unit. The minimum distance md9 between the light source 22009 and the first side 2100a1 may be equal to the minimum distance md7 between the light source 22007 and the first side 2100a1 in the cross-sectional view of the backlight unit.

Referring to FIG. 1, FIG. 2, and FIG. 10, the bottom 2110 (or supporting portion 2110) may be configured to support the plurality of light sources. The supporting portion 2110 may have a step structure, which may include a first portion and a second portion. A minimum distance (related to the distance d3) between the second portion and a light processing sheet (e.g., the diffuser sheet 2410 or an optical sheet 2430) may be greater than a minimum distance (related to the distance d1) between the first portion and the light processing sheet. The light source 22007 may be positioned at (and on) the first portion. The light source 22008 may be positioned at (and on) the second portion. The reflector 2300 may substantially conform to the supporting portion 2110. A structure of the reflector 2300 may be substantially identical to or analogous to a structure of the supporting portion 2110. A structure of the reflector 2300 may be substantially identical to or analogous to a structure of the second side 2100a2 of the wall 2100a in the cross-sectional view of the backlight unit. The reflector 2300 may have a step structure, which may include a first portion and a second portion. The light source 22007 and the light source 22009 may be positioned at the first portion, and the light source 22008 may be positioned at the second portion. The second portion may be positioned farther away from the light processing sheet and from the display panel 1000 than the first portion.

The distance md8 may be sufficiently large, such that light emitted by the light source 22008 (and processed by the light processing member 2400) may sufficiently expand to reach and illuminate edge portions OA of the display panel 1000. Advantageously, satisfactory image quality may be attained, and no additional light sources may be required.

According to embodiments of the present invention, the optical distances at two edge portions of a backlight unit may be longer than the optical distance at the center of the backlight unit. Therefore, light emitted at the two edge portions of the backlight unit may sufficiently diverge (or expand) to substantially fully illuminate the corresponding edge portions of a display panel. Advantageously, the edge portions of the display panel may have sufficient brightness, such that quality of images displayed by the display panel may be satisfactory.

While this invention has been described in connection with what is presently considered to be practical embodiments, the invention is not limited to the disclosed embodiments. This invention is intended to cover various modifications and equivalent arrangements included within the spirit and scope of the appended claims.

What is claimed is:

1. A backlight unit comprising:
   a wall, which has a first side in a cross-sectional view of the backlight unit, wherein the first side has a curved shape in the cross-sectional view of the backlight unit; and
   a plurality light sources, which includes a first light source and a second light source,
   wherein the second light source is positioned farther away from a center portion of the wall than the first light source in the cross-sectional view of the backlight unit, and
   wherein a minimum distance between the second light source and the first side is greater than a minimum distance between the first light source and the first side in the cross-sectional view of the backlight unit,
   wherein the wall has a second side, a third side, and fourth side in the cross-sectional view of the backlight unit,
   wherein the first side is positioned between the third side and the fourth side in the cross-sectional view of the backlight unit,
   wherein the second side is directly connected to each of the third side and the fourth side,
   wherein a distance between the first side and the second side at the center portion of the wall is less than a length of the third side in the cross-sectional view of the backlight unit, and
   wherein a curvature of the second side is less than a curvature of the first side and is greater than 0 in the cross-sectional view of the backlight unit.

2. The backlight unit of claim 1,
   wherein the plurality light sources includes a third light source,
   wherein the third light source is positioned farther away from the center portion of the wall than the first light source in the cross-sectional view of the backlight unit,
   wherein the third light source is positioned closer to the center portion of the wall than the second light source in the cross-sectional view of the backlight unit, and
   wherein the minimum distance between the second light source and the first side is greater than a minimum distance between the third light source and the first side in the cross-sectional view of the backlight unit.

3. The backlight unit of claim 2, wherein the minimum distance between the third light source and the first side is greater than the minimum distance between the first light source and the first side in the cross-sectional view of the backlight unit.

4. A backlight unit comprising:
   a wall, which has a first side in a cross-sectional view of the backlight unit, wherein the first side has a curved shape in the cross-sectional view of the backlight unit; and
   a plurality light sources, which includes a first light source and a second light source,
   wherein the second light source is positioned farther away from a center portion of the wall than the first light source in the cross-sectional view of the backlight unit, and
   wherein a minimum distance between the second light source and the first side is greater than a minimum distance between the first light source and the first side in the cross-sectional view of the backlight unit,
   wherein the plurality light sources includes a third light source,
   wherein the third light source is positioned farther away from the center portion of the wall than the first light source in the cross-sectional view of the backlight unit,
   wherein the third light source is positioned closer to the center portion of the wall than the second light source in the cross-sectional view of the backlight unit,
   wherein the minimum distance between the second light source and the first side is greater than a minimum distance between the third light source and the first side in the cross-sectional view of the backlight unit, and
   wherein the minimum distance between the third light source and the first side is equal to the minimum distance between the first light source and the first side in the cross-sectional view of the backlight unit.

5. The backlight unit of claim 4,
   wherein the wall has a second side, a third side, and fourth side in the cross-sectional view of the backlight unit,
   wherein the first side is positioned between the third side and the fourth side in the cross-sectional view of the backlight unit, and
   wherein the second side is positioned between the third side and the fourth side in the cross-sectional view of the backlight unit.

6. The backlight unit of claim 5, wherein no light source exists between the third side and the second light source in the cross-sectional view of the backlight unit.

7. The backlight unit of claim 5, wherein a curvature of the first side is unequal to a curvature of the second side in the cross-sectional view of the backlight unit.

8. The backlight unit of claim 7, wherein the curvature of the second side is less than the curvature of the first side.

9. The backlight unit of claim 7, wherein the curvature of the second side is 0 in the cross-sectional view of the backlight unit.

10. A backlight unit comprising:
    a wall, which has a first side in a cross-sectional view of the backlight unit, wherein the first side has a curved shape in the cross-sectional view of the backlight unit; and
    a plurality light sources, which includes a first light source and a second light source,
    wherein the second light source is positioned farther away from a center portion of the wall than the first light source in the cross-sectional view of the backlight unit, and
    wherein a minimum distance between the second light source and the first side is greater than a minimum distance between the first light source and the first side in the cross-sectional view of the backlight unit,
    wherein the wall has a second side, a third side, and fourth side in the cross-sectional view of the backlight unit, wherein the first side is positioned between the third side and the fourth side in the cross-sectional view of the backlight unit, wherein the second side is directly connected to each of the third side and the fourth side, wherein a distance between the first side and the second side at the center portion of the wall is less than a length of the third side in the cross-sectional view of the backlight unit, wherein the second side has a step structure, which includes a first portion and a second portion, wherein a minimum distance between the second portion and the first side is greater than a minimum distance between the first portion and the first side, wherein the first light source is positioned at the first portion in the cross-sectional view of the backlight unit, and wherein the second light source is positioned at the second portion in the cross-sectional view of the backlight unit.

11. The backlight unit of claim 10, wherein a curvature of the second portion is equal to a curvature of the first portion in the cross-sectional view of the backlight unit.

12. The backlight unit of claim 10, wherein a curvature of the second portion is equal to a curvature of the first side in the cross-sectional view of the backlight unit.

13. The backlight unit of claim 10, wherein the plurality of light sources includes a third light source, wherein the third light source is positioned at the first portion and is positioned farther away from the center portion of the wall than the first light source in the cross-sectional view of the backlight unit, and wherein the minimum distance between the second light source and the first side is greater than a minimum distance between the third light source and the first side in the cross-sectional view of the backlight unit.

14. The backlight unit of claim 10, wherein the minimum distance between the third light source and the first side is equal to the minimum distance between the first light source and the first side in the cross-sectional view of the backlight unit.

* * * * *